United States Patent [19]

Vovk et al.

[11] 4,382,588
[45] May 10, 1983

[54] PORTABLE SKI VISE AND SKI RACK

[76] Inventors: Marko E. Vovk, 2920 Hemlock Dr., Willoughby Hills, Ohio 44094; Theodore Radisek, 24690 Hawthorn Dr., Euclid, Ohio 44117

[21] Appl. No.: 251,768

[22] Filed: Apr. 7, 1981

[51] Int. Cl.³ ............................ B60R 9/12; B25B 1/20
[52] U.S. Cl. ........................................ 269/43; 269/88; 269/95; 269/243; 269/906; 280/814
[58] Field of Search ................. 224/917, 42.46 R; 280/814, 815; 269/88, 43, 906, 21, 95, 243; 211/60 SK, 86, 113; 248/206 R, 362, 363; 108/44, 46

[56] References Cited

U.S. PATENT DOCUMENTS

| | | |
|---|---|---|
| 2,083,299 | 6/1937 | Hunter . |
| 3,159,370 | 1/1964 | Rubinstein . |
| 3,854,712 | 12/1974 | McGee . |
| 4,066,250 | 1/1978 | Campbell . |
| 4,077,554 | 3/1978 | Goode ................................ 280/814 |
| 4,081,180 | 3/1978 | Munn ................................ 269/906 |
| 4,234,112 | 11/1980 | Gallant ................................ 280/814 |

Primary Examiner—Robert C. Watson
Attorney, Agent, or Firm—Yount & Tarolli

[57] ABSTRACT

A ski rack which can also be used as a vise includes a base member and a perpendicular leg at either end, one leg fixed and the other hinged to move into and out of the perpendicular position. A suction cup is located along the underside of the base member. To secure the rack to a smooth surface, the fixed leg of the rack is placed thereon, the rack is forced downward until the suction cup contacts the surface and the air is expelled from it, and the hinged leg is swung down into the perpendicular position, against the smooth surface, forcing the base member upwards to increase the suction in the suction cup. For use as a vise, the rack has a pair of jaws, one movable, along the base member to grip lateral edges of a ski. A spaced apart pair of vises provides increased support. For use as a rack to hold skis along an automobile side window, a pair of racks are mounted along the window, one in front of the other, each in a vertical orientation. First pins extend outward from the fixed leg of each vise, and rubber bands secure two pairs of skis to the first pins. Second pins, extending through the base members and threaded into the movable legs to hold them perpendicular, similarly receive two other pairs of skis. A hook and strap extending from the rack over the top edge of the window prevent downward movement of each rack.

4 Claims, 7 Drawing Figures

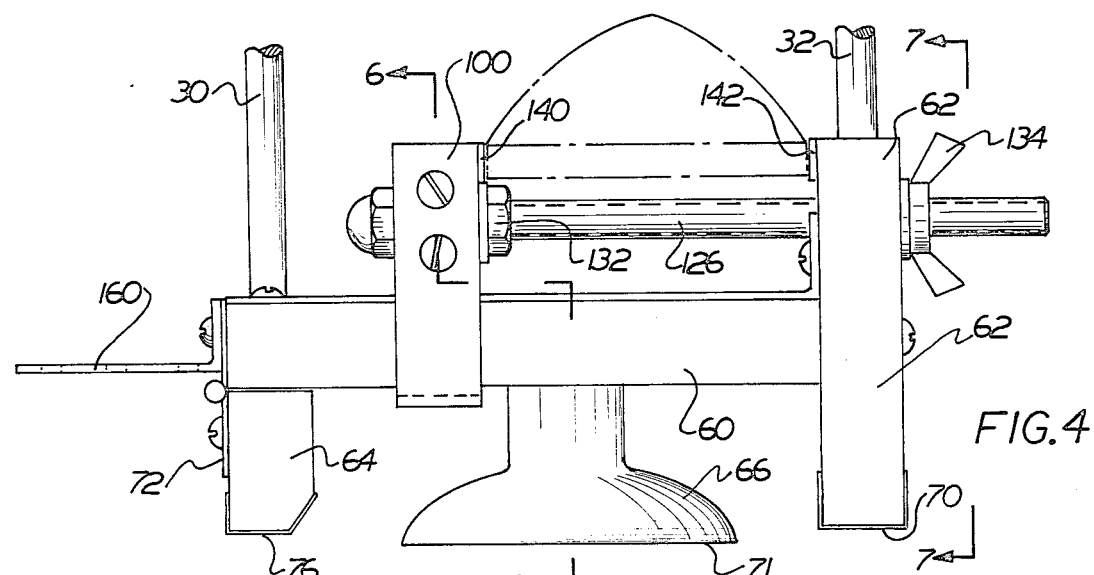
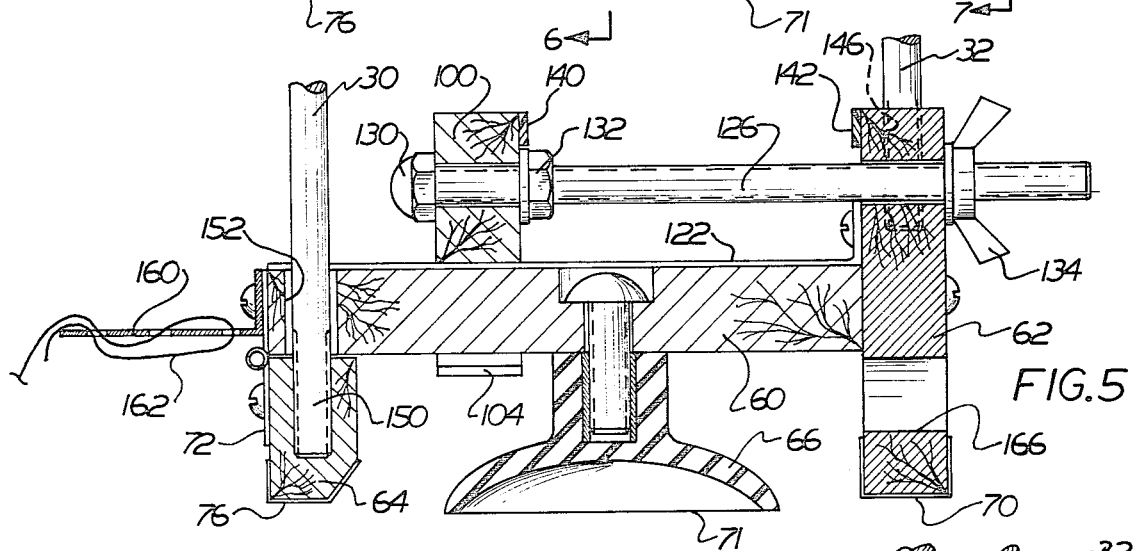
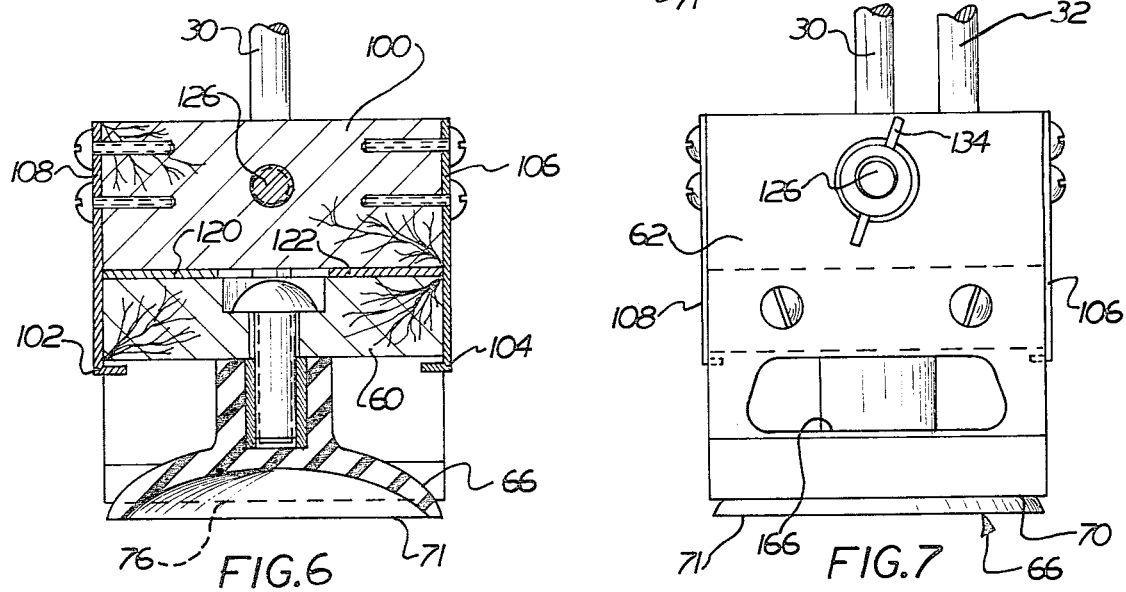

PORTABLE SKI VISE AND SKI RACK

BACKGROUND OF THE INVENTION

The present invention relates to a combined ski rack and ski vise for snow skis, and in particular the present invention relates to a device which may be attached to an automobile to carry skis and which may also be attached to any smooth surface to hold skis steady for maintenance.

Various types of vises for holding snow skis steady have been made in the past. Such vises may be used by retailers to hold skis steady while bindings are installed and/or by skiers while waxing their skis or sharpening edges. These vises have not proved entirely satisfactory to skiers because commercial quality vises are too expensive and vises intended for use by skiers to hold skis for waxing, etc. tend to be bulky and heavy and therefore, inconvenient to use upon arrival at a ski slope or the beginning of a cross country trail.

Also known are various types of racks which are used to transport skis on an automobile to and from recreational areas. Ski racks are known which attach to automobile tops, to automobile trunk lids or to automobile windows. Known ski racks perform only the single function of transporting skis to and from recreational areas, aside from possible conversion to carry some other type of article on the vehicle to which they are attached.

SUMMARY OF THE INVENTION

The present invention provides a ski rack which also serves as a vise to hold a ski for waxing or other maintenance procedures. A pair of identical vises constructed according to the present invention may be used to grip a ski by its edges. Each vise has a suction cup for mounting the vise to any smooth surface and a pair of jaws, one movable with respect to the other. In addition, the pair of vises of the present invention may be attached to an automobile, and together the vises hold as many as four pairs of skis for transportation to and from a recreational area.

Each vise has a base with a suction cup mounting and the base can be used to securely and stably mount the vise to any smooth surface. Each vise includes a flat, rectangular base to the underside of which a suction cup is attached. A fixed leg extends across one width of the base and is connected to the base perpendicular to the plane of the base. The fixed leg is slightly shorter than the suction cup so that an end surface of the leg lies in a plane just above the bottom of the suction cup when it is in its relaxed condition. A second, hinged leg is attached to the opposite width of the base and can be pivoted into and out of a locking position in which it is perpendicular to the base and has an end surface even with the previously mentioned end surface of the fixed leg.

To attach the apparatus to any smooth support surface the hinged leg is first pivoted out of the locking position. With the bottom of the fixed leg resting on the underlying surface, the base is pivoted downward about the fixed leg until the rim of the suction cup makes contact with the surface and air is expelled from the suction cup to establish a vacuum. Then the base is lifted upward, drawing the suction cup upward to increase the vacuum. The base is pivoted upward until it is parallel with the support surface, at which point the hinged leg is turned downward to its locking position perpendicular to the base to hold the "suction" in the suction cup. Since both legs make contact along a surface which is as wide as the base itself, the vise is held stable on the underlying surface.

When using the pair of vises as a ski rack to transport skis on an automobile or other vehicle, the vises are attached, one in front of the other, to a side window of the vehicle where the suction cup on each holds it against the window. The vises are oriented with the fixed leg below the hinged leg and a pin extends outward from each leg to support the skis. Each pair of skis rests on one pin from the front vise and one pin from the rear vise, and the skis are held in place on the pin by a stretchable rubber strap. Because each pin is long enough to accommodate two pairs of skis side by side and each vise has two pins extending from it, one above the other, a total of four pairs of skis can be carried.

The pins which hold the pairs of skis when using the vise as a ski rack are removable, and the pin connected with the hinged leg also serves to hold that leg in its locking position perpendicular to the base while using the base as a ski rack. The base is provided with a hole only slightly larger in diameter than the pin and which is coaxially aligned with a threaded hole in the hinged leg only when the hinged leg is perpendicular to the base. Inserting the pin through the hole in the base and screwing it into the hole in the hinged leg holds the hinged leg perpendicular to the base.

A flexible, inelastic strap holds each vise from slipping downward on the window of a vehicle. One end of the strap is connected with the base along the same edge as the hinged leg and the other end of the strap is fitted with a hook which fits over the top edge of the window glass. The strap thus prevents downward movement of the vise.

BRIEF DESCRIPTION OF THE DRAWINGS

These and other features of the present invention will be apparent upon reading the following specification in view of the attached drawings in which:

FIG. 4 is a side elevation view of the vise illustrated in FIG. 3;

FIG. 5 is a longitudinal sectional view of the vise illustrated in FIG. 4;

FIG. 6 is a sectional view of the vise illustrated in FIG. 4 taken along line 6—6 of FIG. 4; and FIG. 7 is an end elevational view taken along line 7—7 of FIG. 4.

DESCRIPTION OF PREFERRED EMBODIMENT

Figure 1:
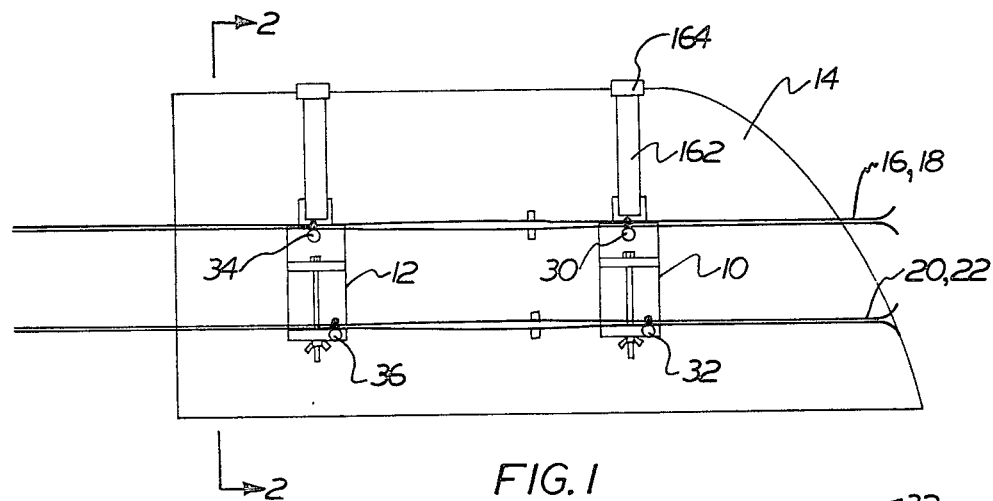
FIG. 1 illustrates a pair of ski vises constructed in accordance with the present invention, attached to the window of an automobile, and supporting four pairs of skis.
Figure 2:
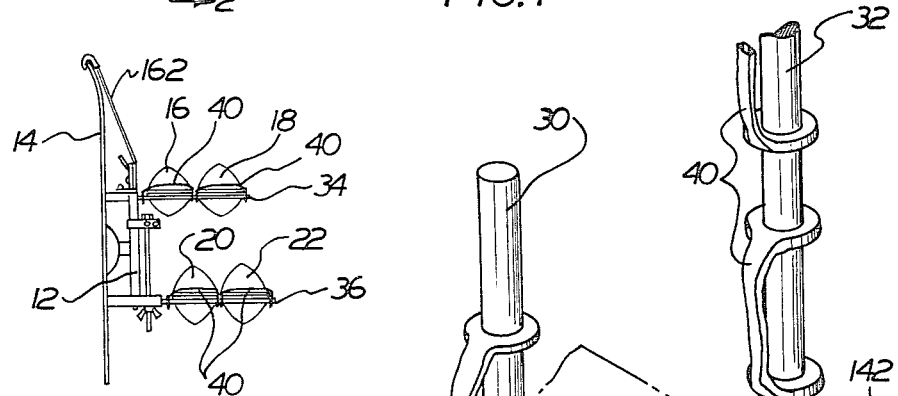
FIG. 2 is a side view taken generally along line 2—2 of FIG. 1.
Figure 3:
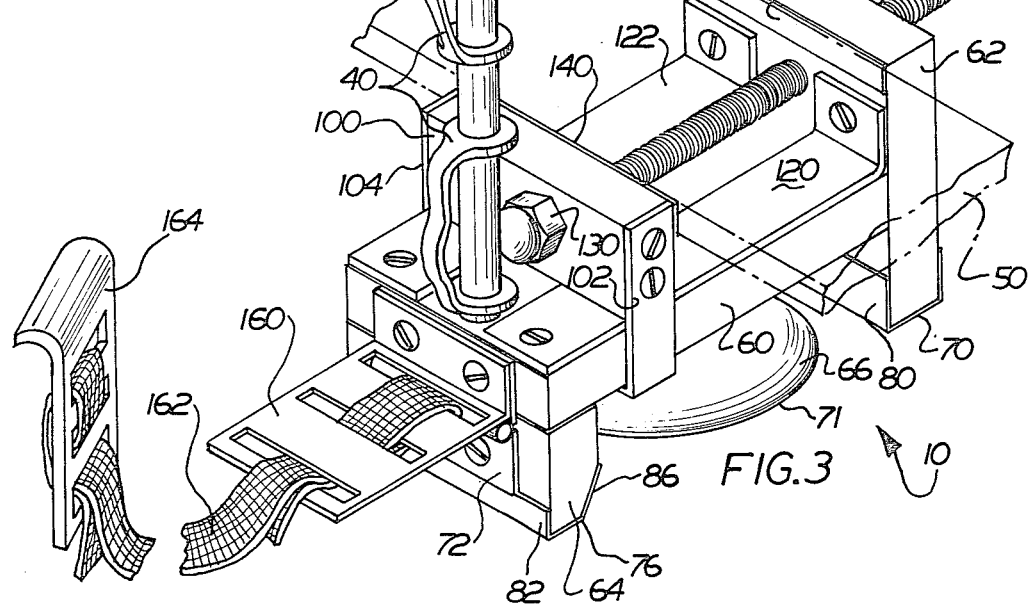
FIG. 3 is a perspective illustration of one of the pair of vises illustrated in FIG. 1.

FIG. 1 illustrates a pair of combined ski racks and ski vises 10 and 12 constructed in accordance with the present invention. The combined ski racks and vises 10 and 12 are attached to a side window 14 of an automobile (not shown) and four pairs of skis 16, 18, 20 and 22 (FIG. 2) are supported by the combined ski racks and vises 10 and 12. One of the racks (10, FIG. 1) is attached to the window 14 in front of the other (12), and the combined ski vise and rack 10 has upper and lower support pins 30 and 32 extending outwardly in a plane generally perpendicular to the plane of the window 14. The combined ski vise and rack 12 has similar upper and lower support pins 34 and 36 which extend outwardly generally perpendicular to the plane of the window 14. Two pairs of skis 16 and 18 rest on the upper support pins 30 and 34 at spaced apart locations, and likewise the pairs of skis 20 and 22 rest on the lower support pins 32 and 36. Each pair of skis is secured to the support pins by rubber bands 40, four of which are shown in FIG. 3.

The combined ski racks and vises 10 and 12 may also be used to support a ski for maintenance operations such as sharpening of edges or application of wax. In this case also, a pair of combined ski racks and vises are used, one engaging the front portion of the ski and the other engaging the rear portion of the skis.

Because the combine ski racks and vises 10 and 12 are identical, only the combined ski rack and vise 10 will be described in detail. It will be understood that the description of the ski vise 10 applies equally to the ski vise 12. FIG. 3 shows a perspective illustration of the ski vise 10 shown removed from the automobile window. A single ski 50 shown in phantom illustrates how the vise 10 grips a ski by opposite lateral edges with the bottom of the ski parallel with the plane of the base member 60.

The ski vise 10 comprises a rectangular base member 60 which has a pair of legs 62 and 64 extending downwardly therefrom. Attached to the underside of base 60 between the two legs 62 and 64 is a suction cup 66 made of a resilient rubber material. The suction cup 66 cooperates with the legs 62 and 64 to securely attach the combined ski vise and rack 10 to any smooth, nonporous surface such as the window 14 (FIG. 1) of an automobile, or, a horizontal surface, such as the hood of an automobile, or a plastic laminate-type table top (when it is desired to use the device 10 as a vise).

The base member 60 is approximately as wide as the diameter of the suction cup 66 and the fixed leg 62 is fixedly connected perpendicular to the base member and extends the full width thereof. The fixed leg 62 has a lower end surface 70 which lies in a plane generally parallel to the plane of the base member 60 and slightly above the plane of the rim 71 of the suction cup 66 when the suction cup is relaxed. The leg 64 is connected with the base member 60 by means of a hinge 72. In this way, the hinged leg 64 can be moved between a locking position in which it is generally perpendicular to the plane of the base member 60 and parallel to the plane of fixed leg 62 and a position in which it is generally perpendicular to the plane of the fixed leg 62.

To attach the vise 10 to any smooth, nonporous surface, the hinged leg 64 is folded away from the locking position illustrated in FIG. 3 so that it is generally parallel to the plane of the base member 60. (As will be discussed below, the upper support pin 30 must be removed in order to turn the hinged leg 64 from the position illustrated in FIG. 3.) The vise 10 is then pushed downward toward the underlying smooth surface so that the suction cup engages the surface, air is expelled from the suction cup, and "suction" is established. Thereafter, the vise 10 is lifted upward and pivoted about the lower end surface 70 of the fixed leg 62 as the hinged leg 64 is rotated back to the locking position illustrated in FIG. 3. Thus, the suction in the cup is increased, and the suction cup 66 tends to draw the vise downward toward the underlying smooth surface, while the lower end surface 70 of the fixed leg 62 and the lower end surface 76 of the hinged leg 64 steady the vise 10 on the surface.

A fabric covering 80 which may be felt or a similar material is provided on the lower end surface 70 of the fixed leg 62 and also extends part way up the sides of the fixed leg 62. Similarly, a fabric covering 82 is provided on the lower end portion of the hinged leg 64. These coverings protect the surface of which the vise 10 may be attached from scratches or other damage. To facilitate movement of the hinged leg 64, it has a bevelled face 86.

In the event that a smooth surface is not readily available, an ordinary C-clamp may be used to attach the vise 10 to a table top. For this purpose the fixed leg 62 (FIG. 7) is provided with an opening 166 into which the C-clamp may be inserted.

The vise 10 (FIG. 5) has a movable jaw 100 which is slidably mounted on the base member 60. The movable jaw is supported by a pair of L-shaped brackets 102 and 104 (FIG. 6) which engage opposite end faces 106 and 108 of the jaw 100 and extend downward and turn under the base member 60. The L-brackets 102 and 104 permit movement of the jaw 100 but constrain the jaw to remain generally perpendicular to the base member 60 and parallel to the fixed leg 62.

The movable jaw 100 moves in opposition to the fixed leg 62 which provides a fixed jaw to grip the ski 50. A pair of metal L-shaped brackets 120 and 122 (FIG. 3) are fixedly connected to the fixed leg 62 and the base member 60. These brackets provide support for the connection between the fixed leg 62 and the base member 60 as well as providing a smooth surface on which the movable jaw 100 can slide.

The movable jaw 100 can be drawn toward the fixed leg 62 by means of a threaded shaft 126. One end of the threaded shaft is connected to the movable jaw by means of a cap nut 130 and a locking nut 132. A manually manipulatable wing nut 134 is threaded onto the shaft 126, and when turned, the wing nut 134 draws the movable jaw 100 toward the fixed leg 62.

The faces of the movable jaw 100 and the fixed leg 62 which engage the sides of the ski 50 are provided with protective vinyl jaw faces 140 and 142 so that the edges of the ski 50 are not damaged by being gripped in the vise 10.

The pins 30 and 32 are connected to the vise 10 to support the pairs of skis 16, 18, 20, and 22 as previously described. The pin 32 (FIG. 5) is threaded into a corresponding hole 146 in the fixed leg 62. Both the pins 30 and 32 are removable so as not to be in the way while using the vise 10 for maintenance or waxing. The pin 30 performs the additional job of holding the hinged leg in its locking perpendicular to the base member 60 when the vise 10 is used as a rack.

Referring to FIG. 5, it can be seen that the support pin 30 is connected with the hinged leg 64 by a threaded connection. The lower end portion 150 of the support pin 30 is provided with threads which engage corresponding threads in the hinged leg 64. The base member 60 is provided with a clearance hole 152 which is slightly larger in diameter than the diameter of the pin 30 (the clearance has been exaggerated in FIG. 5 for purposes of illustration). When the pin 30 is threaded into the hinged leg 64, the pin extends through the clearance hole 152 and prevents motion of the hinged leg 64 out of the position in which it is shown in FIG. 5.

The vise 10 (FIG. 3) is also provided with an L-shaped bracket 160 which is connected to the end of the base member 60 by the same screws that are used to retain the hinge 72. The L-shaped bracket 160 extends generally parallel to the plane of the base member 60 and has provided therein a plurality of slots through which one end portion of a strap of flexible material 162 may be interwoven. At the other end of the strap 162 is a hook 164. The hook 164 is adapted to engage the upper edge of the window 14 (FIGS. 1 and 2) and together the hook 164 and strap 162 prevent the vise 10 from moving downward on the window 14. It is contemplated that the hook 164 may be made of metal or plastic, but if it is made of metal, it is further contemplated that it will be coated with a material that will prevent damage to the glass of the window 14.

Once the vises 10 and 12 are in position on the window 14, and the upper and lower support pins 30, 32, 34 and 36 are in place, the pairs of skis 16, 18, 20, and 22 may be positioned on the skis and retained by rubber bands 40.

The base member 60, the fixed leg 62, the hinged leg 64 and the movable jaw 100 are all made of wood. However, it is contemplated that they could be made of plastic or some other material. In this case, the fixed leg 62 and the base member would be integrally molded and the bracket 160 could also be formed as part of the same unit.

Thus, it is clear that the present invention provides a ski rack 10 (FIG. 3) which also serves as a vise to hold a ski 50 for waxing or other maintenance procedures. A pair of identical vises 10 and 12 constructed according to the present invention may be used to grip a ski by its edges. Each vise 10 has a suction cup 66 for mounting the vise to any smooth surface and a pair of jaws 140, 142, one movable with respect to the other. In addition, the pair of vises of the present invention may be attached to an automobile, and together the vises hold as many as four pairs of skis for transportation to and from a recreational area.

Each vise 10 has a base 60 with a suction cup mounting and the base can be used to securely and stably mount the vise to any smooth surface. Each vise includes a flat, rectangular base 60 to the underside of which a suction cup 66 is attached. A fixed leg 62 extends across one width of the base and is connected to the base perpendicular to the plane of the base. The fixed leg 62 is slightly shorter than the suction cup 66 so that an end surface 70 of the leg 62 lies in a plane just above the bottom 71 of the suction cup when it is in its relaxed condition. A second, hinged leg 64 is attached to the opposite width of the base 60 and can be pivoted between a position in which it is perpendicular to the base and has an end surface 76 even with the previously mentioned end surface 70 of the fixed leg 62 and a position in which it extends parallel to the base.

To attach the apparatus 10 to any smooth support surface the hinged leg 64 is folded out to its initial position. With the bottom 70 of the fixed leg 62 resting on the underlying surface, the base 60 is pivoted downward about the fixed leg until the rim 71 of the suction cup 66 makes contact with the surface and air is expelled from the suction cup to establish a vacuum. Then the base 60 is pivoted upward, drawing the suction cup upward to increase the vacuum. The base 60 is pivoted upward until it is parallel with the support surface, at which point the hinged leg 64 is turned downward to its locking position perpendicular to the base 60 to hold the "suction" in the suction cup. Since both legs 62 and 64 make contact along a surface which is as wide as the base 60 itself, the vise 10 is held stable to the underlying surface.

When using the pair of vises 10, 12 (FIG. 1) as a ski rack to transport skis on an automobile or other vehicle, the vises are attached, one in front of the other, to a side window 14 of the vehicle where the suction cup 66 on each holds it against the window. The vises 10, 12 (FIG. 2) are oriented with the fixed leg 62 below the hinged leg 64 and a pin 30, 32 extends outward from each leg to support the skis. Each pair of skis 16, 18, 20 and 22 rests on one pin from the front vise and one pin from the rear vise, and the skis are held in place on the pin by a stretchable rubber strap 40. Because each pin 30, 32 is long enough to accommodate two pairs of skis side by side and each vise 10, 12 has two pins extending from it, one above the other, a total of four pairs of skis can be carried.

The pins 30 and 32 are removable, and the pin 30 connected with the hinged leg 64 also serves to hold that leg in the locking position perpendicular to the base 60 while using the base as a ski rack. The base 60 is provided with a hole 152 (FIG. 3) only slightly larger in diameter than the pin 30 and which is coaxially aligned with a threaded hole in the hinged leg 64 only when the hinged leg is perpendicular to the base. Inserting the pin 30 through the hole in the base 60 and screwing it into the hole in the hinged leg 64 holds the hinged leg perpendicular to the base.

A flexible, inelastic strap 162 (FIG. 2) holds each vise 10, 12 from slipping downward on the window 14. One end of the strap is connected with the base along the same edge as the hinged leg and the other end of the strap is fitted with a hook 164 which fits over the top edge of the window glass. The strap thus prevents downward movement of the vise.

What is claimed is:

1. A combined ski rack and ski vise comprising a base having a generally planar base member, suction means for attaching said base to a smooth nonporous surface with the plane of said base member generally parallel to the plane of said smooth surface, vise means connected with said base for releasably gripping a ski by opposite lateral edges to position the bottom of the ski generally parallel to the plane of said base member, an axially extending pin connected with said base and extending generally perpendicular to the plane of said base member, resilient strap means for attaching a ski to said pin with the bottom of the ski generally parallel with the axis of said pin, and strap means connected with said base for restraining said base against vertical movement when said suction means is attached to a generally vertical surface.

2. A combined ski rack and ski vise as set forth in claim 1 further including a second axially extending pin.

3. A combined ski rack and ski vise as set forth in claim 2 wherein said first and second pins are removable.

4. A combined ski rack and ski vise as set forth in claim 3 wherein said base member is generally rectangular and wherein said combined ski rack and ski vise further includes first and second legs attached to opposite end portions of said base member, said first leg being fixedly connected with said base member and extending generally perpendicular thereto, said second leg being pivotally connected with said base member and pivotable into and out of a position in which said second leg is generally perpendicular to said base member, and means for releasably holding said second leg generally perpendicular to said base member, said holding means comprising a first passage through said base member and a second passage through said second leg, said first passage being only slightly larger in diameter than said first pin and coaxially aligned with said second passage when said second leg is perpendicular to said base member, and said first pin extending through said first passage and being threadably received in said second passage to hold said second leg against movement relative to said base member.

* * * * *